(12) United States Patent
Kaleko et al.

(10) Patent No.: US 12,651,123 B2
(45) Date of Patent: Jun. 9, 2026

(54) SYSTEM AND METHOD FOR ASSOCIATED NARRATIVE BASED TRANSCRIPTION SPEAKER IDENTIFICATION

(71) Applicant: MOTOROLA SOLUTIONS, INC., Chicago, IL (US)

(72) Inventors: David Kaleko, Natick, MA (US); Rahul S Pawar, Chicago, IL (US); Yanlin Han, Naperville, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 610 days.

(21) Appl. No.: 17/450,192

(22) Filed: Oct. 7, 2021

(65) Prior Publication Data

US 2023/0113421 A1     Apr. 13, 2023

(51) Int. Cl.
*G06F 17/27* (2006.01)
*G06F 40/205* (2020.01)
(Continued)

(52) U.S. Cl.
CPC ............ *G06F 40/30* (2020.01); *G06F 40/205* (2020.01); *G06V 20/40* (2022.01); *G10L 15/22* (2013.01);
(Continued)

(58) Field of Classification Search
CPC ......... G10L 17/00; G10L 17/10; G10L 15/22; G10L 25/90; G10L 15/16; G10L 15/26;
(Continued)

(56) References Cited

U.S. PATENT DOCUMENTS 6,219,639 B1 * 4/2001 Bakis ..................... G10L 17/10
                                                382/116
9,571,652 B1     2/2017 Zeppenfeld et al.
(Continued)

FOREIGN PATENT DOCUMENTS

CN      108399923 A     8/2018
WO      2018231106 A1   12/2018

OTHER PUBLICATIONS

Jousse, Vincent & Petitrenaud, Simon & Meignier, Sylvain & Esteve, Yannick & Jacquin, Christine. (2009). Automatic named identification of speakers using diarization and ASR systems. 4557-4560. 10.1109/ICASSP.2009.4960644.
(Continued)

*Primary Examiner* — Michael Ortiz-Sanchez

(57) ABSTRACT

Techniques for associated narrative based transcription speaker identification are provided. A narrative of an incident is received at a computing device. The narrative describes an incident. An identification of at least one person involved in the incident is extracted from the narrative. The identification includes a specific identifier for the at least one person. Semantic information is extracted from the narrative. A transcript of media capturing the incident is received at the computing device. The transcript includes a generic identifier for at least one speaker whose speech was transcribed. The generic identifier for the at least one speaker whose speech was transcribed is correlated with the identification based on the semantic information. The generic identifier for the at least one speaker in the transcript is replaced with the specific identifier included in the identification.

18 Claims, 7 Drawing Sheets

(51) Int. Cl.

| | |
|---|---|
| *G06F 40/30* | (2020.01) |
| *G06V 20/40* | (2022.01) |
| *G10L 15/22* | (2006.01) |
| *G10L 17/00* | (2013.01) |
| *H04M 3/56* | (2006.01) |
| *G10L 15/26* | (2006.01) |

(52) U.S. Cl.
CPC ............. *G10L 17/00* (2013.01); *H04M 3/567* (2013.01); *G10L 15/26* (2013.01); *H04M 2201/40* (2013.01)

(58) Field of Classification Search
CPC ... H04M 2201/40; H04M 3/567; G06F 40/30; G06F 40/20; G06F 40/205; G06F 40/279; G06V 20/40
See application file for complete search history.

(56) References Cited

U.S. PATENT DOCUMENTS

| | | | | |
|---|---|---|---|---|
| 9,691,386 | B2 * | 6/2017 | Formhals | ................ G10L 15/26 |
| 2011/0032845 | A1 * | 2/2011 | Agapi | ................... H04L 12/413 704/E15.001 |
| 2015/0025887 | A1 | 1/2015 | Sidi et al. | |
| 2017/0352345 | A1 * | 12/2017 | Kurata | .................... G10L 15/01 |
| 2018/0143956 | A1 * | 5/2018 | Skarbovsky | .......... G06F 40/166 |
| 2019/0318743 | A1 * | 10/2019 | Reshef | .................... G10L 25/78 |
| 2020/0211561 | A1 | 7/2020 | Degraye et al. | |
| 2021/0201892 | A1 * | 7/2021 | Lyu | ........................ G06N 20/00 |
| 2021/0263965 | A1 * | 8/2021 | Li | .......................... G06V 20/41 |
| 2021/0304747 | A1 * | 9/2021 | Haas | ................... G06Q 30/016 |
| 2021/0366488 | A1 * | 11/2021 | Lu | .......................... G10L 17/00 |

OTHER PUBLICATIONS

Nikolaos Flemotomos, Panayiotis Georgiou, Shrikanth Narayanan: "Linguistically Aided Speaker Diarization Using Speaker Role Information", http://dx.doi.org/10.21437/Odyssey.2020-17, DOI= {10.21437/odyssey.2020-17}, The Speaker and Language Recognition Workshop (Odyssey 2020), ISCA, Nov. 2020.

The International Search Report and the Written Opinion corresponding patent application No. PCT/US2022/043173 filed Sep. 12, 2022 mailed: Nov. 4, 2022, all pages.

* cited by examiner

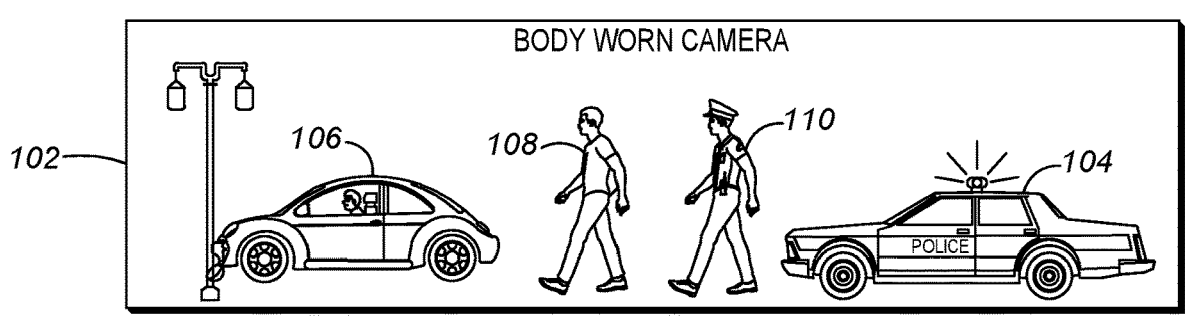

102—

BODY WORN CAMERA

106—    108—    —110    —104

POLICE

121— BODY WORN CAMERA VIDEO FOR INCIDENT #12345
122— DATE: 10-SEPTEMBER-2021

120— TRANSCRIPT:

131— SPEAKER 1: SIR, YOU APPEAR TO HAVE BEEN IN A CAR ACCIDENT. ARE YOU OK OR DO YOU NEED AN AMBULANCE?

132— SPEAKER 2: NO. I AM FINE, I DON'T NEED AN AMBULANCE.

133— SPEAKER 3: YOU SEEM TO BE HAVING A LITTLE TROUBLE STANDING UP STRAIGHT. HAVE YOU HAD ANYTHING ALCOHOLIC TO DRINK TONIGHT?

134— SPEAKER 2: NO, I HAVE NOT HAD ANYTHING TO DRINK TONIGHT.

135— SPEAKER 1: WHY DON'T YOU HAVE A SEAT IN THE BACK OF THE PATROL CAR WHILE WE FIGURE THIS OUT.

136— SPEAKER 3: BASED ON HIS EYE MOVEMENTS, I THINK HE IS DRUNK.

137— SPEAKER 1: I AGREE. PLUS, HE HAS THE SMELL OF ALCOHOL ON HIS BREATH. WE SHOULD ARREST HIM ON SUSPICION OF DRIVING UNDER THE INFLUENCE.

138— SPEAKER 3: I AGREE.

139— SPEAKER 1: PLEASE STEP OUT OF THE CAR AND PUT YOUR HANDS BEHIND YOUR BACK. YOU ARE BEING ARRESTED ON SUSPICION OF DRIVING UNDER THE INFLUENCE.

140— SPEAKER 3: YOU HAVE THE RIGHT TO REMAIN SILENT. ANYTHING YOU SAY CAN AND WILL BE USED AGAINST YOU IN A COURT OF LAW. YOU HAVE THE RIGHT TO AN ATTORNEY. IF YOU CANNOT AFFORD AN ATTORNEY, ONE WILL BE APPOINTED FOR YOU.

141— SPEAKER 1: ALRIGHT. LET'S GO DROP THIS GUY OFF AT THE JAIL.

Figure 2:
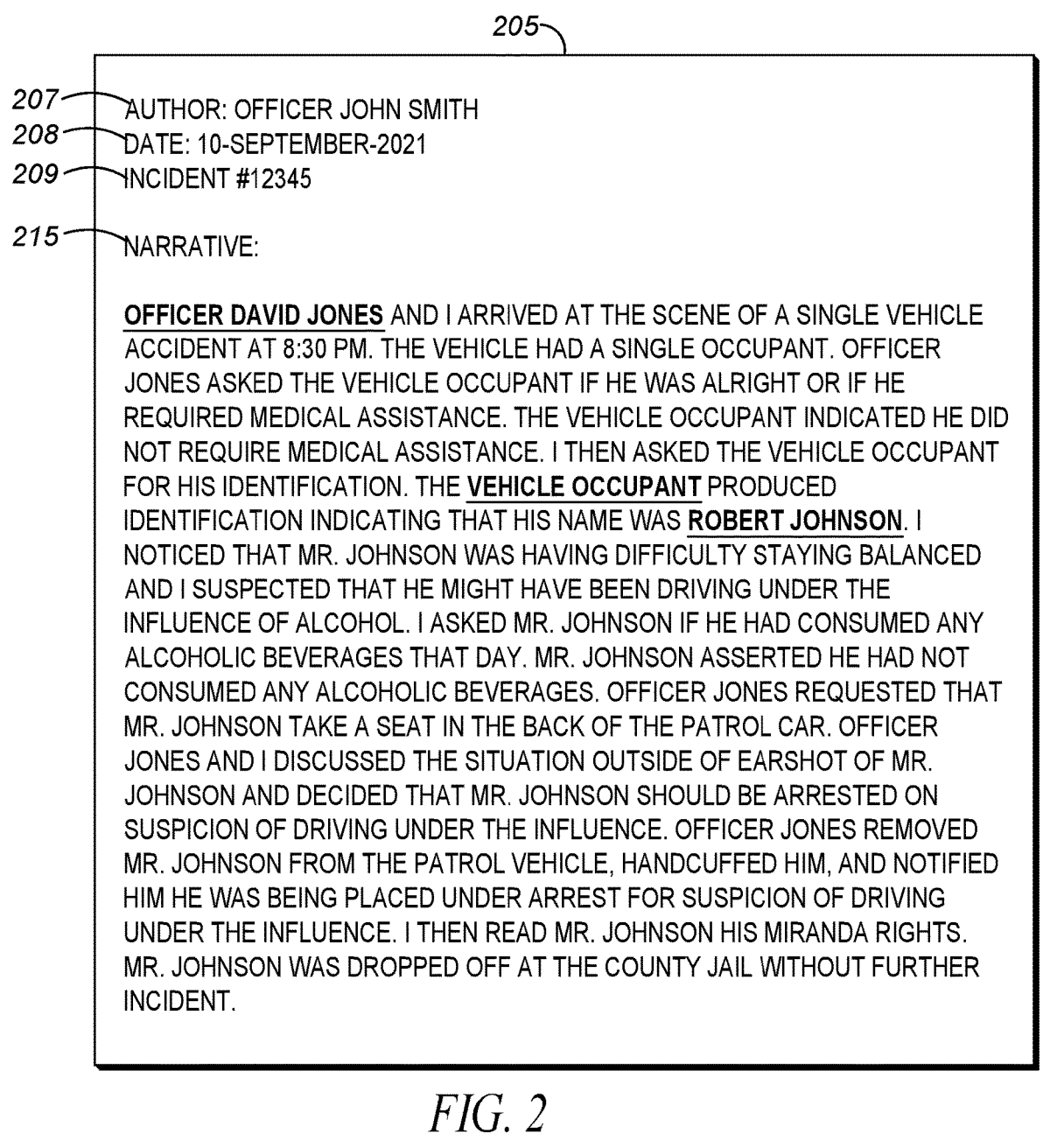

207 — AUTHOR: OFFICER JOHN SMITH
208 — DATE: 10-SEPTEMBER-2021
209 — INCIDENT #12345

215 — NARRATIVE:

OFFICER DAVID JONES AND I ARRIVED AT THE SCENE OF A SINGLE VEHICLE ACCIDENT AT 8:30 PM. THE VEHICLE HAD A SINGLE OCCUPANT. OFFICER JONES ASKED THE VEHICLE OCCUPANT IF HE WAS ALRIGHT OR IF HE REQUIRED MEDICAL ASSISTANCE. THE VEHICLE OCCUPANT INDICATED HE DID NOT REQUIRE MEDICAL ASSISTANCE. I THEN ASKED THE VEHICLE OCCUPANT FOR HIS IDENTIFICATION. THE VEHICLE OCCUPANT PRODUCED IDENTIFICATION INDICATING THAT HIS NAME WAS ROBERT JOHNSON. I NOTICED THAT MR. JOHNSON WAS HAVING DIFFICULTY STAYING BALANCED AND I SUSPECTED THAT HE MIGHT HAVE BEEN DRIVING UNDER THE INFLUENCE OF ALCOHOL. I ASKED MR. JOHNSON IF HE HAD CONSUMED ANY ALCOHOLIC BEVERAGES THAT DAY. MR. JOHNSON ASSERTED HE HAD NOT CONSUMED ANY ALCOHOLIC BEVERAGES. OFFICER JONES REQUESTED THAT MR. JOHNSON TAKE A SEAT IN THE BACK OF THE PATROL CAR. OFFICER JONES AND I DISCUSSED THE SITUATION OUTSIDE OF EARSHOT OF MR. JOHNSON AND DECIDED THAT MR. JOHNSON SHOULD BE ARRESTED ON SUSPICION OF DRIVING UNDER THE INFLUENCE. OFFICER JONES REMOVED MR. JOHNSON FROM THE PATROL VEHICLE, HANDCUFFED HIM, AND NOTIFIED HIM HE WAS BEING PLACED UNDER ARREST FOR SUSPICION OF DRIVING UNDER THE INFLUENCE. I THEN READ MR. JOHNSON HIS MIRANDA RIGHTS. MR. JOHNSON WAS DROPPED OFF AT THE COUNTY JAIL WITHOUT FURTHER INCIDENT.

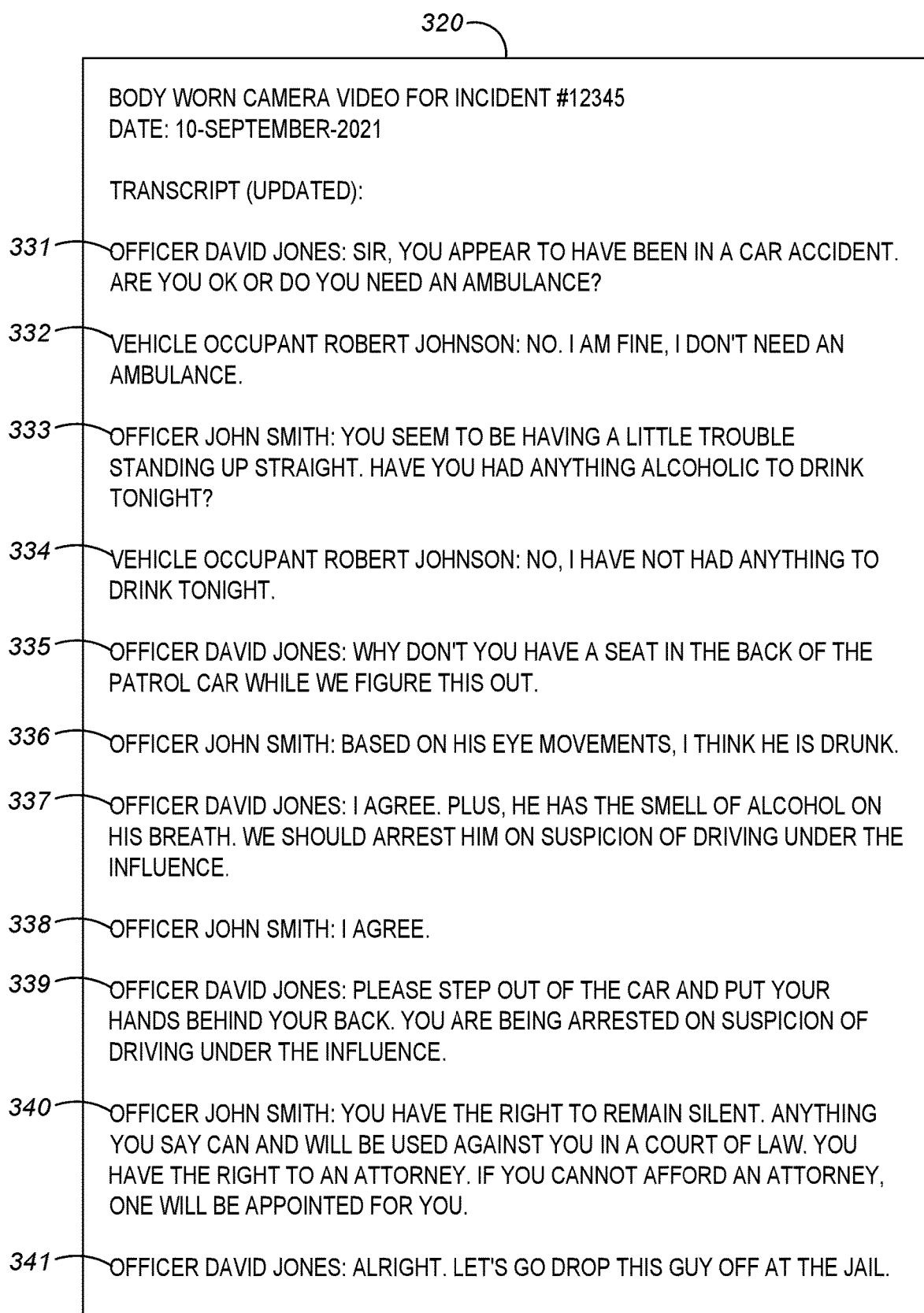

BODY WORN CAMERA VIDEO FOR INCIDENT #12345
DATE: 10-SEPTEMBER-2021

TRANSCRIPT (UPDATED):

331 — OFFICER DAVID JONES: SIR, YOU APPEAR TO HAVE BEEN IN A CAR ACCIDENT. ARE YOU OK OR DO YOU NEED AN AMBULANCE?

332 — VEHICLE OCCUPANT ROBERT JOHNSON: NO. I AM FINE, I DON'T NEED AN AMBULANCE.

333 — OFFICER JOHN SMITH: YOU SEEM TO BE HAVING A LITTLE TROUBLE STANDING UP STRAIGHT. HAVE YOU HAD ANYTHING ALCOHOLIC TO DRINK TONIGHT?

334 — VEHICLE OCCUPANT ROBERT JOHNSON: NO, I HAVE NOT HAD ANYTHING TO DRINK TONIGHT.

335 — OFFICER DAVID JONES: WHY DON'T YOU HAVE A SEAT IN THE BACK OF THE PATROL CAR WHILE WE FIGURE THIS OUT.

336 — OFFICER JOHN SMITH: BASED ON HIS EYE MOVEMENTS, I THINK HE IS DRUNK.

337 — OFFICER DAVID JONES: I AGREE. PLUS, HE HAS THE SMELL OF ALCOHOL ON HIS BREATH. WE SHOULD ARREST HIM ON SUSPICION OF DRIVING UNDER THE INFLUENCE.

338 — OFFICER JOHN SMITH: I AGREE.

339 — OFFICER DAVID JONES: PLEASE STEP OUT OF THE CAR AND PUT YOUR HANDS BEHIND YOUR BACK. YOU ARE BEING ARRESTED ON SUSPICION OF DRIVING UNDER THE INFLUENCE.

340 — OFFICER JOHN SMITH: YOU HAVE THE RIGHT TO REMAIN SILENT. ANYTHING YOU SAY CAN AND WILL BE USED AGAINST YOU IN A COURT OF LAW. YOU HAVE THE RIGHT TO AN ATTORNEY. IF YOU CANNOT AFFORD AN ATTORNEY, ONE WILL BE APPOINTED FOR YOU.

341 — OFFICER DAVID JONES: ALRIGHT. LET'S GO DROP THIS GUY OFF AT THE JAIL.

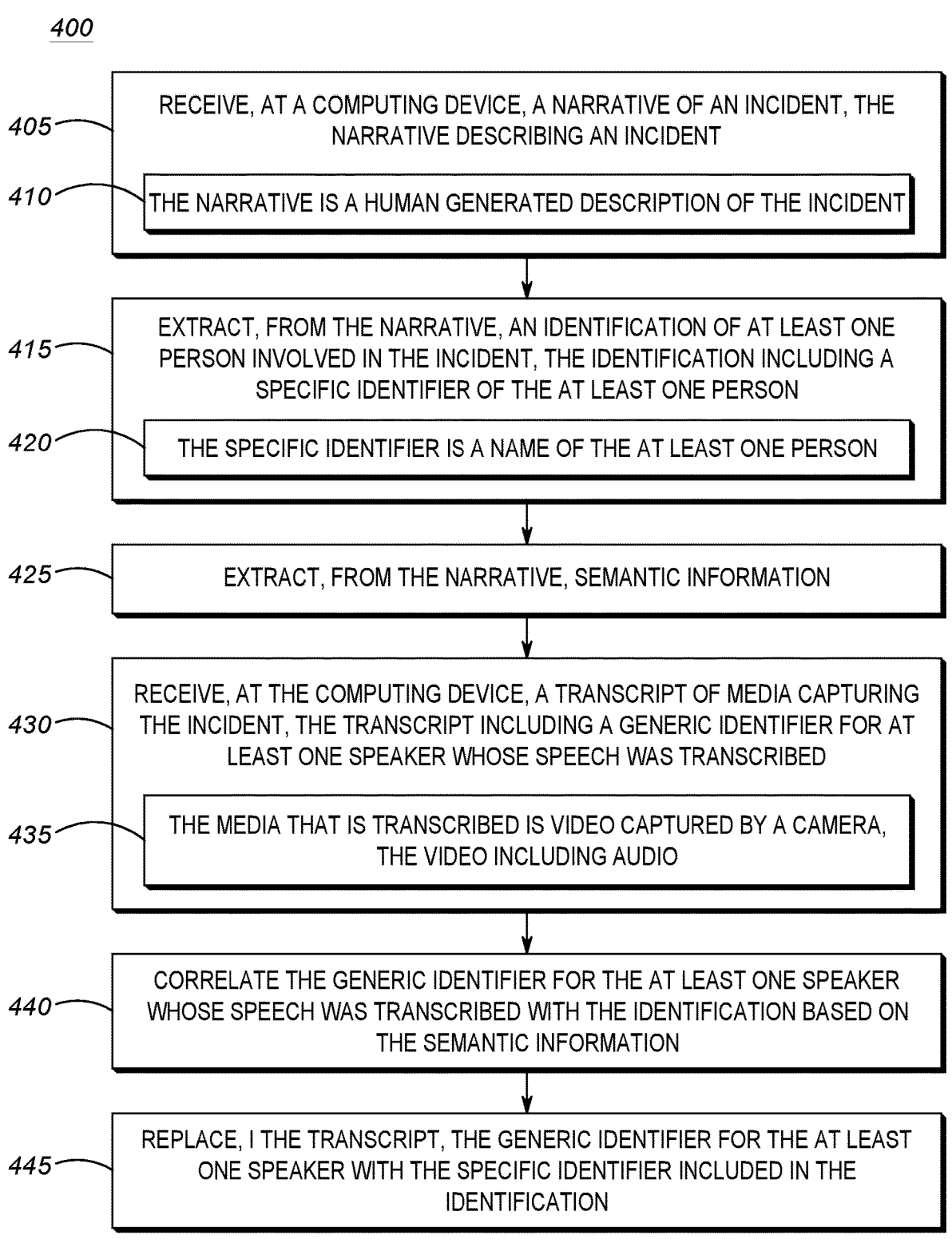

405 — RECEIVE, AT A COMPUTING DEVICE, A NARRATIVE OF AN INCIDENT, THE NARRATIVE DESCRIBING AN INCIDENT

410 — THE NARRATIVE IS A HUMAN GENERATED DESCRIPTION OF THE INCIDENT

415 — EXTRACT, FROM THE NARRATIVE, AN IDENTIFICATION OF AT LEAST ONE PERSON INVOLVED IN THE INCIDENT, THE IDENTIFICATION INCLUDING A SPECIFIC IDENTIFIER OF THE AT LEAST ONE PERSON

420 — THE SPECIFIC IDENTIFIER IS A NAME OF THE AT LEAST ONE PERSON

425 — EXTRACT, FROM THE NARRATIVE, SEMANTIC INFORMATION

430 — RECEIVE, AT THE COMPUTING DEVICE, A TRANSCRIPT OF MEDIA CAPTURING THE INCIDENT, THE TRANSCRIPT INCLUDING A GENERIC IDENTIFIER FOR AT LEAST ONE SPEAKER WHOSE SPEECH WAS TRANSCRIBED

435 — THE MEDIA THAT IS TRANSCRIBED IS VIDEO CAPTURED BY A CAMERA, THE VIDEO INCLUDING AUDIO

440 — CORRELATE THE GENERIC IDENTIFIER FOR THE AT LEAST ONE SPEAKER WHOSE SPEECH WAS TRANSCRIBED WITH THE IDENTIFICATION BASED ON THE SEMANTIC INFORMATION

445 — REPLACE, I THE TRANSCRIPT, THE GENERIC IDENTIFIER FOR THE AT LEAST ONE SPEAKER WITH THE SPECIFIC IDENTIFIER INCLUDED IN THE IDENTIFICATION

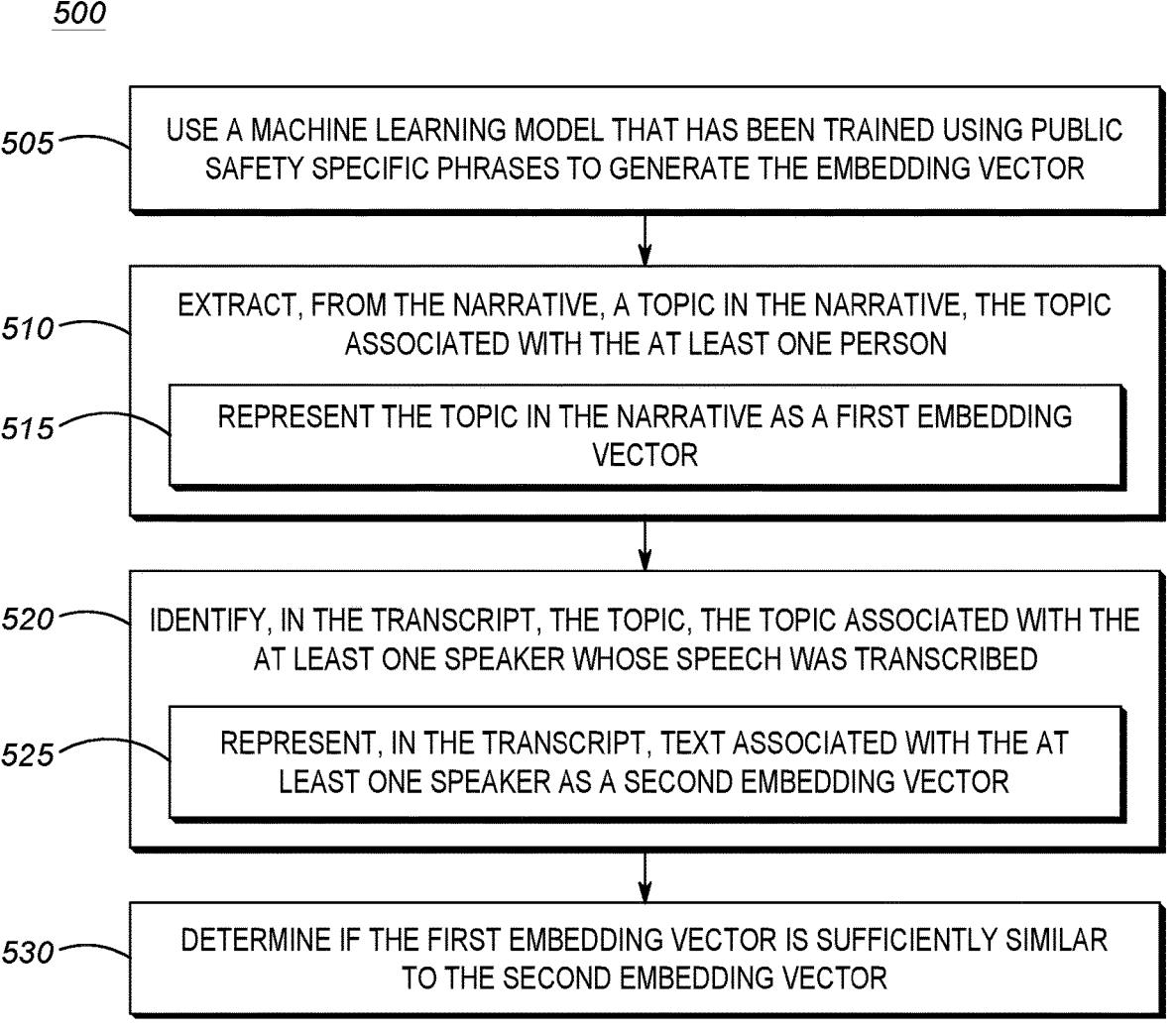

505 — USE A MACHINE LEARNING MODEL THAT HAS BEEN TRAINED USING PUBLIC SAFETY SPECIFIC PHRASES TO GENERATE THE EMBEDDING VECTOR

510 — EXTRACT, FROM THE NARRATIVE, A TOPIC IN THE NARRATIVE, THE TOPIC ASSOCIATED WITH THE AT LEAST ONE PERSON

515 — REPRESENT THE TOPIC IN THE NARRATIVE AS A FIRST EMBEDDING VECTOR

520 — IDENTIFY, IN THE TRANSCRIPT, THE TOPIC, THE TOPIC ASSOCIATED WITH THE AT LEAST ONE SPEAKER WHOSE SPEECH WAS TRANSCRIBED

525 — REPRESENT, IN THE TRANSCRIPT, TEXT ASSOCIATED WITH THE AT LEAST ONE SPEAKER AS A SECOND EMBEDDING VECTOR

530 — DETERMINE IF THE FIRST EMBEDDING VECTOR IS SUFFICIENTLY SIMILAR TO THE SECOND EMBEDDING VECTOR

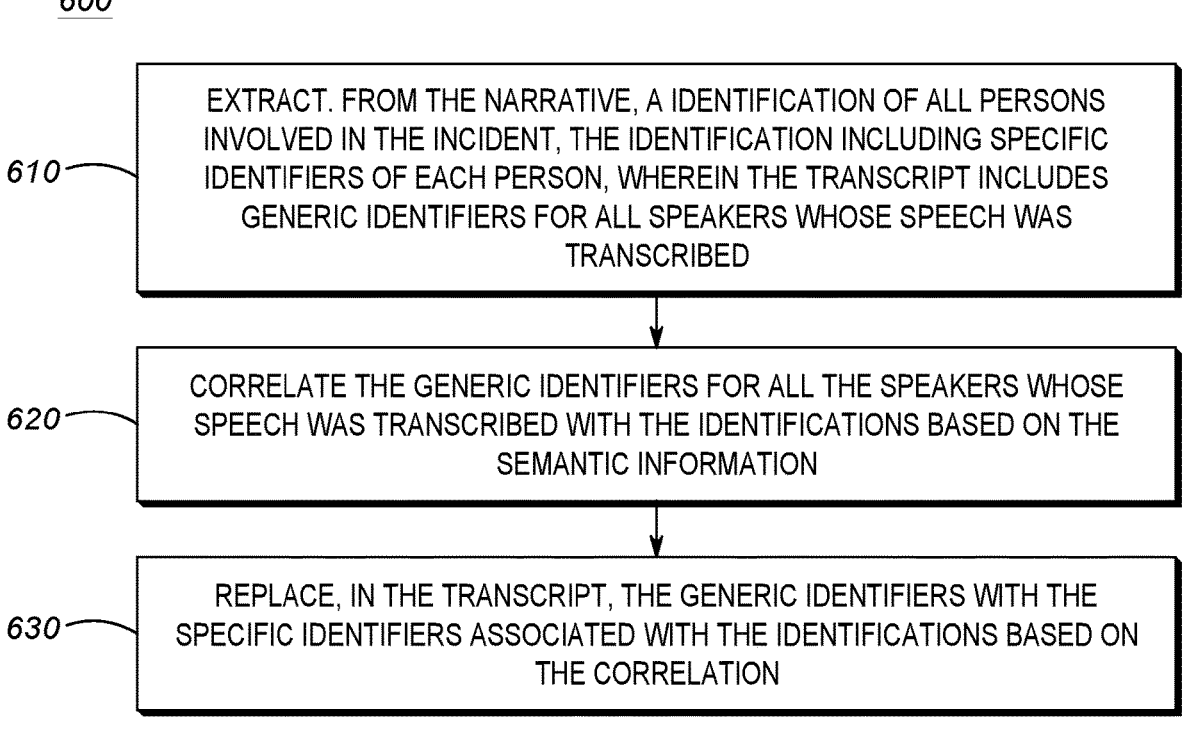

610 — EXTRACT. FROM THE NARRATIVE, A IDENTIFICATION OF ALL PERSONS INVOLVED IN THE INCIDENT, THE IDENTIFICATION INCLUDING SPECIFIC IDENTIFIERS OF EACH PERSON, WHEREIN THE TRANSCRIPT INCLUDES GENERIC IDENTIFIERS FOR ALL SPEAKERS WHOSE SPEECH WAS TRANSCRIBED

620 — CORRELATE THE GENERIC IDENTIFIERS FOR ALL THE SPEAKERS WHOSE SPEECH WAS TRANSCRIBED WITH THE IDENTIFICATIONS BASED ON THE SEMANTIC INFORMATION

630 — REPLACE, IN THE TRANSCRIPT, THE GENERIC IDENTIFIERS WITH THE SPECIFIC IDENTIFIERS ASSOCIATED WITH THE IDENTIFICATIONS BASED ON THE CORRELATION

*FIG. 6*

SYSTEM AND METHOD FOR ASSOCIATED NARRATIVE BASED TRANSCRIPTION SPEAKER IDENTIFICATION

BACKGROUND

The field of automatic transcription of electronic media has continued to make significant progress, both in terms of ease of access to transcription services as well as accuracy of transcriptions. Transcription of audio sources has been adopted in many fields of endeavor, including public safety. For example, a public safety officer, such as a police officer, may have a body worn camera (BWC) that captures audio and video of the officer's interaction with the public. The audio captured by the BWC may be sent to a transcription service that utilizes speech to text technology to convert any audible speech that was captured into text. The text may be easier to include in reports as well as may be easier to search using known search techniques.

Great progress has also been made in the field of speech diarization. Diarization is the process of partitioning an audio stream into segments according to speaker identity. For example, a BWC may capture a scene in which three people are talking. Diarization techniques may be used to determine which portions of the captured audio were spoken by each of the three people in the scene. The results of the diarization may also be applied to the transcript, such that the transcript provides an indication of which words were spoken by which person in the scene.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments FIG. 1 is an example of a transcript that was created from a body worn camera video capturing an interaction between public safety officers and a member of the public.

FIG. 2 is an example of a public safety officer's narrative describing the interaction between the public safety officers and the member of the public.

FIG. 3 is an example of the transcript as modified based on the narrative.

FIG. 4 is an example of a high-level flow diagram for associated narrative based transcription speaker identification according to the techniques described herein.

FIG. 5 is an example of a high-level flow diagram for using embedding vectors to correlate topics in the narrative and transcript according to the techniques described herein.

FIG. 6 is an example of a high-level flow diagram for identifying all speakers in a transcript according to the techniques described herein.

Figure 7:
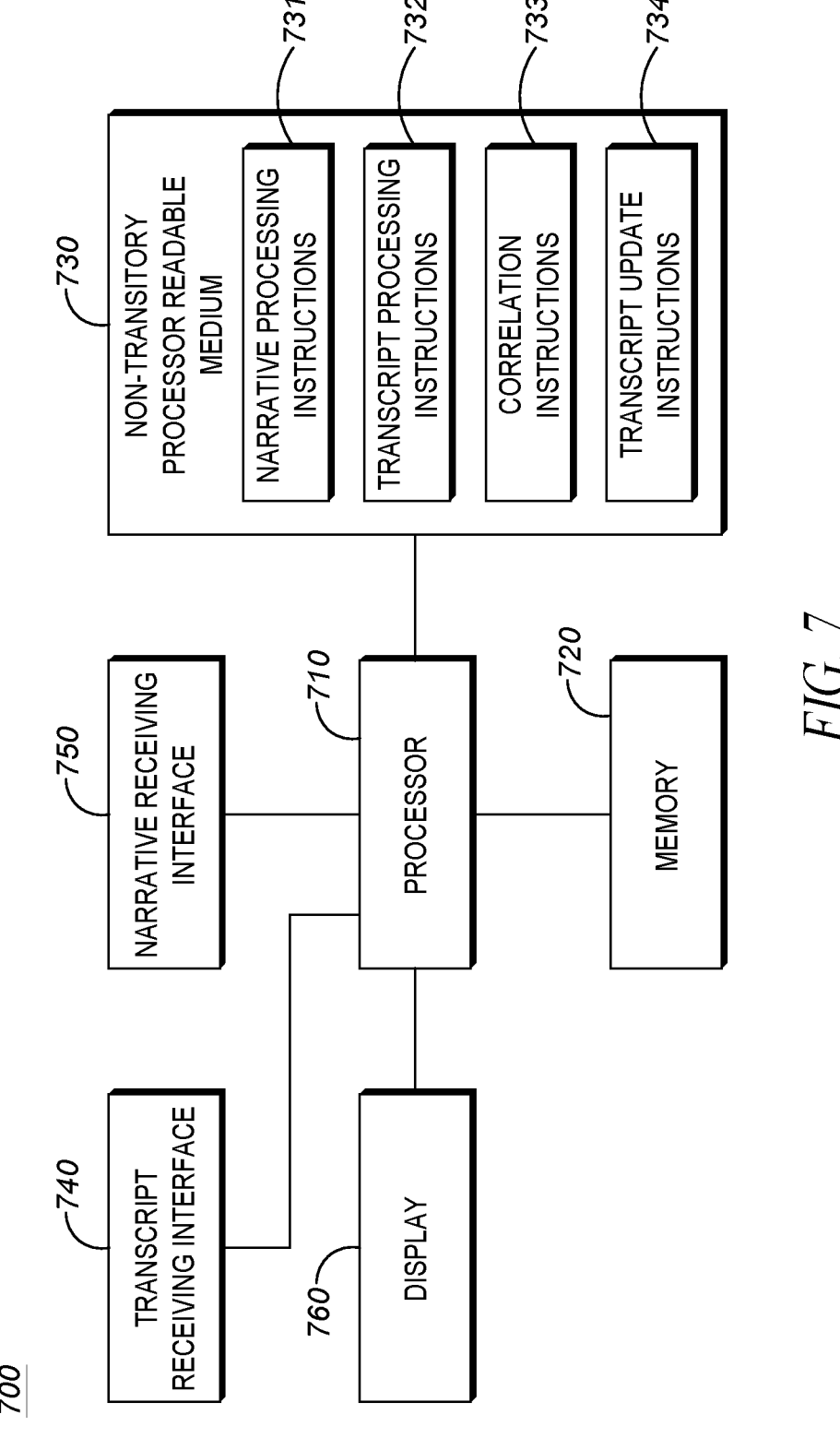
FIG. 7 is an example of a device that may implement the associated narrative based transcription speaker identification according to the techniques described herein.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Although the improvements in transcription and diarization allow for more accurate speech to text conversion of audio as well as segmentation of speakers, a problem arises in that the resulting transcript may still be confusing. For example, consider a case where three people are in a scene having a conversation that is captured by a BWC. Because people engaged in a conversation do not generally identify themselves (e.g. by name, etc.) prior to speaking, the diarization process may, at best, identify the total number of speakers (e.g. Speaker 1, Speaker 2, Speaker 3, etc.). The transcript may then be segmented based on the speaker. An example of such diarization is shown in FIG. 1.

Such a transcript, although more useful than a stream of text with no indication whatsoever, may still be confusing if the identity/role of the person speaking is not clear. For example, consider a case where a police officer and a trespassing suspect are speaking. A transcript with diarization of the conversation may be:

Speaker 1: "Why are you here?"

Speaker 2: "I am authorized to be here."

Without knowing which speaker is the officer and which speaker is the suspect, a simple reading of the transcript could be confusing. For example, if speaker 1 is the officer, then the response from the suspect (speaker 2) indicates that the suspect does not believe that he has done anything wrong. On the other hand, if speaker 1 is the suspect, then this may indicate that the suspect is challenging the reason why the officer (speaker 2) is present at the location.

The techniques described herein overcome this problem through the use of an external, descriptive text. In the context of public safety, in particular law enforcement, first responders are often required to document their on duty actions in the form of a narrative. A narrative is an explanation or summary of what occurred. A narrative may include, amongst other things, an identification of all persons present, any evidence collected, locations (e.g. addresses, etc.), procedures performed (e.g. first aid administered, Miranda rights read, etc.) or any other descriptive information. The narrative is a summary of what occurred (e.g. the scene captured by a BWC, etc.) and should not be confused with the word for word conversion of the captured audio from speech to text in the transcript.

The techniques described herein may extract entity identifiers (e.g. names of people present, etc.) from the narrative. The identifiers from the narrative may be associated with individual speakers in the diarized transcript by correlating the contents of the narrative, both semantic and syntactic, relationships described in the narrative, and natural language processing, with the speakers in the transcript. For example, the narrative may read, "I stopped trespassing suspect John Doe. I asked the suspect why he was at the location. Suspect responded he was authorized to be at the location." From this portion of the narrative, it can be determined that one of the people on scene was named John Doe, and that he responded to a question by saying he was authorized to be at the location.

Using natural language processing, the response in the example above could be correlated with the transcript attributed to Speaker 2. Because the narrative can be analyzed to extract that John Doe is the suspect, and the suspect answered the question by saying he was authorized to be at the location, it can be inferred that John Doe is the one who answered the question. Thus, Speaker 2 is can be identified as John Doe, and the transcript can be updated to reflect this (e.g. John Doe: "I am authorized to be here.").

A method for associated narrative based transcription speaker identification is provided. The method includes receiving, at a computing device, a narrative of an incident, the narrative describing an incident. The method also includes extracting, from the narrative, an identification of at least one person involved in the incident, the identification including a specific identifier of the at least one person. The method also includes extracting, from the narrative, semantic information. The method also includes receiving, at the computing device, a transcript of media capturing the incident, the transcript including a generic identifier for at least one speaker whose speech was transcribed. The method also includes correlating the generic identifier for the at least one speaker whose speech was transcribed with the identification based on the semantic information. The method also includes replacing, in the transcript, the generic identifier for the at least one speaker with the specific identifier included in the identification.

In one aspect, the correlation further comprises extracting, from the narrative, a topic in the narrative, the topic associated with the at least one person and identifying, in the transcript, the topic, the topic associated with the at least one speaker whose speech was transcribed. In one aspect, identifying the topic and correlation further comprises representing the topic in the narrative as a first embedding vector, representing, in the transcript, text associated with the at least one speaker as a second embedding vector, and determining if the first embedding vector is sufficiently similar to the second embedding vector. In one aspect, representing the topic as a feature vector further comprises using a machine learning model that has been trained using public safety specific phrases to generate the embedding vector. In one aspect, the media that is transcribed is video captured by a camera, the video including audio.

In one aspect, the method further comprises extracting, from the narrative, an identification of all persons involved in the incident, the identification including specific identifiers of each person, wherein the transcript includes generic identifiers for all speakers whose speech was transcribed, correlating the generic identifiers for all the speakers whose speech was transcribed with the identifications based on the semantic information, and replacing, in the transcript, the generic identifiers with the specific identifiers associated with the identifications based on the correlation. In one aspect, the narrative is a human generated description of the incident. In one aspect, the specific identifier is a name of the at least one person.

A system for associated narrative based transcription speaker identification. The system includes a processor and a memory coupled to the processor. The memory contains a set of instructions thereon that when executed by the processor cause the processor to receive a narrative of an incident, the narrative describing an incident. The instructions further cause the processor to extract, from the narrative, an identification of at least one person involved in the incident, the identification including a specific identifier of the at least one person. The instructions further cause the processor to extract, from the narrative, semantic information. The instructions further cause the processor to receive a transcript of media capturing the incident, the transcript including a generic identifier for at least one speaker whose speech was transcribed. The instructions further cause the processor to correlate the generic identifier for the at least one speaker whose speech was transcribed with the identification based on the semantic information. The instructions further cause the processor to replace, in the transcript, the generic identifier for the at least one speaker with the specific identifier included in the identification.

In one aspect, the correlation instructions further comprise instructions to extract, from the narrative, a topic in the narrative, the topic associated with the at least one person and identify, in the transcript, the topic, the topic associated with the at least one speaker whose speech was transcribed. In one aspect, the identifying the topic and correlation instructions further comprise instructions to represent the topic in the narrative as a first embedding vector, represent, in the transcript, text associated with the at least one speaker as a second embedding vector, and determine if the first embedding vector is sufficiently similar to the second embedding vector. In one aspect, representing the topic as a feature vector instructions further comprise instructions to use a machine learning model that has been trained using public safety specific phrases to generate the embedding vector. In one aspect, the media that is transcribed is video captured by a camera, the video including audio.

In one aspect, the system further comprises instructions to extract, from the narrative, an identification of all persons involved in the incident, the identification including specific identifiers of each person, wherein the transcript includes generic identifiers for all speakers whose speech was transcribed, correlate the generic identifiers for all the speakers whose speech was transcribed with the identifications based on the semantic information, and replace, in the transcript, the generic identifiers with the specific identifiers associated with the identifications based on the correlation.

A non-transitory processor readable medium is provided. The medium contains a set of instructions thereon that when executed by a processor cause the processor to receive a narrative of an incident, the narrative describing an incident. The medium also includes instructions that cause the processor to extract, from the narrative, an identification of at least one person involved in the incident, the identification including a specific identifier of the at least one person. The medium also includes instructions that cause the processor to extract, from the narrative, semantic information. The medium also includes instructions that cause the processor to receive a transcript of media capturing the incident, the transcript including a generic identifier for at least one speaker whose speech was transcribed. The medium also includes instructions that cause the processor to correlate the generic identifier for the at least one speaker whose speech was transcribed with the identification based on the semantic information. The medium also includes instructions that cause the processor to replace, in the transcript, the generic identifier for the at least one speaker with the specific identifier included in the identification.

In one aspect, the correlation instructions on the medium further comprise instructions to extract, from the narrative, a topic in the narrative, the topic associated with the at least one person and identify, in the transcript, the topic, the topic associated with the at least one speaker whose speech was transcribed. In one aspect, the identifying the topic and correlation instructions on the medium further comprise instructions to represent the topic in the narrative as a first embedding vector, represent, in the transcript, text associated with the at least one speaker as a second embedding vector, and determine if the first embedding vector is sufficiently similar to the second embedding vector. In one aspect, the instructions on the medium to represent the topic as a feature vector instructions further comprise instructions to use a machine learning model that has been trained using public safety specific phrases to generate the embedding vector. In one aspect, the media that is transcribed is video captured by a camera, the video including audio.

In one aspect, the medium further comprises instructions to extract, from the narrative, an identification of all persons involved in the incident, the identification including specific identifiers of each person, wherein the transcript includes generic identifiers for all speakers whose speech was transcribed, correlate the generic identifiers for all the speakers whose speech was transcribed with the identifications based on the semantic information, and replace, in the transcript, the generic identifiers with the specific identifiers associated with the identifications based on the correlation.

Further advantages and features consistent with this disclosure will be set forth in the following detailed description, with reference to the figures.

FIG. 1 is an example of a transcript that was created from a body worn camera video capturing an interaction between public safety officers and a member of the public. Field of view 102 may be a video captured by a video camera, such as a body worn video camera carried by a public safety officer such as a law enforcement officer. The body worn camera may capture both audio and video. Although FIG. 1 is described in terms of a body worn video camera that captures audio, it should be understood that the audio used to generate a transcript can come from any source. For example, it could be audio of a phone call, such as a phone call to 911, a cell phone call, or any other form of audio only communication. In addition, the video may be from any video source that includes audio, such as an in vehicle camera (e.g. dash cam), a fixed camera (e.g. surveillance camera, etc.), or any other type of camera that records audio that may be transcribed.

In the example scene 102 shown in FIG. 1, there may be a police car 104 as well as a civilian vehicle 106. The civilian vehicle is shown as having been involved in a single car accident. Also shown are an occupant 108 of the civilian vehicle and a police officer 110. The scene 102 may have been captured by a second police officer's body worn camera. Since the body worn camera of the officer would not actually capture the image of the officer wearing the camera, the second officer is not depicted in scene 102.

Transcript 120 may be a transcription, with diarization, of the audio captured from the body worn camera. The techniques described herein are not dependent on any particular form or technique used for transcription and any currently available or later developed transcription mechanism would be suitable for use with the techniques described herein. Likewise, there are currently many different mechanisms that may be used for diarization of the speakers. In one example, voiceprints are established for all the recorded audio segments. All segments that have similar and/or the same voiceprint are attributed to the same speaker. The techniques described herein are not limited to any particular form of diarization. Any currently available or later developed techniques for diarization of a transcript would be suitable for use with the techniques described herein.

In the present example, there are three total speakers whose audio was captured (e.g. the two officers, civilian vehicle occupant). As should be clear, the process of diarization can group the speech segments (and hence the transcript text) based on each speaker. However, each speaker may only be identified via a generic identifier, because the transcription/diarization process may have no context as to the identity of each speaker. The transcript 120 may include some identifying information such as an incident identifier associated with the transcript 121 and a date the transcript was created 122. It should be noted that in some implementations transcripts may be generated in real time while in other implementations the transcripts may be generated in an offline process that occurs later in time. For example, transcripts of all audio may be batch processed at the end of each day. The techniques described herein are not dependent on when and/or how the transcripts are generated.

A generic identifier identifies each speaker. In the present example, there are three speakers and they are simply numbered in the order they speak. However, the techniques described herein are not dependent on any particular form of generic identifier. The generic identifier may be a letter, number, or any combination thereof. What should be understood is that each segment of the transcript is associated with a particular speaker, even if the identity of that speaker is not known. For completeness sake, the transcript 120 is reproduced below.

Speaker 1: "Sir, you appear to have been in a car accident. Are you OK or do you need an ambulance?" 131

Speaker 2: "No. I am fine, I don't need an ambulance." 132

Speaker 3: "You seem to be having a little trouble standing up straight. Have you had anything alcoholic to drink tonight?" 133

Speaker 2: "No, I have not had anything to drink tonight." 134

Speaker 1: "Why don't you have a seat in the back of the patrol car while we figure this out." 135

Speaker 3: "Based on his eye movements, I think he is drunk." 136

Speaker 1: "I agree. Plus, he has the smell of alcohol on his breath. We should arrest him on suspicion of driving under the influence." 137

Speaker 3: "I agree." 138

Speaker 1: "Please step out of the car and put your hands behind your back. You are being arrested on suspicion of driving under the influence." 139

Speaker 3: "You have the right to remain silent. Anything you say can and will be used against you in a court of law. You have the right to an attorney. If you cannot afford an attorney, one will be appointed for you." 140

Speaker 1: "Alright. Let's go drop this guy off at the jail." 141

What should be understood is that it is difficult to understand what is going on at the incident location based on the transcript alone. Although in the present example, it is relatively easy to figure out which speakers are police officers and which one is the suspect, it was presented this way for ease of description. An actual transcript may be much more complicated, with many different speakers, wherein it may be difficult to tell who is who based on the text alone.

FIG. 2 is an example of a public safety officer's narrative describing the interaction between the public safety officers and the member of the public. As described above, simply viewing the transcript of an incident may not provide sufficient information about the context of what is occurring. Police officers generally write reports following an incident, with the report including a narrative of what occurred during the incident. It should be noted that the narrative is a description of what occurred and is not the same thing as a transcript. As will be described in further detail below, the narrative may not necessarily include the same words as the transcript, even though the same portion of the event is being described.

The report 205 may include identifying information for the person who is creating the report. In the present example, the report author is Officer John Smith 207. The report may also include additional identifying information such as a date 208 the report was created and an incident identifier 209 associated with the report. This identifying information may allow the reports to be compared with the transcripts in order to supplement the transcripts, as will be described in further detail below. It should be understood that the identification information is simply exemplary, and an actual report would likely have significantly more identifying information.

The narrative portion of the report 215 may include a detailed description of the incident, written in first person perspective of the officer writing the narrative. For completeness sake, the example narrative depicted in FIG. 2 is reproduced below.

"Officer David Jones and I arrived at the scene of a single vehicle accident at 8:30 PM. The vehicle had a single occupant. Officer Jones asked the vehicle occupant if he was alright or if he required medical assistance. The vehicle occupant indicated he did not require medical assistance. The vehicle occupant produced identification indicating that his name was Robert Johnson. I noticed that Mr. Johnson was having difficulty staying balanced and I suspected that he might have been driving under the influence of alcohol. I asked Mr. Johnson if he had consumed any alcoholic beverages that day. Mr. Johnson asserted he had not consumed any alcoholic beverages. Officer Jones requested that Mr. Johnson take a seat in the back of the patrol car. Officer Jones and I discussed the situation outside of earshot of Mr. Johnson and decided that Mr. Johnson should be arrested on suspicion of driving under the influence. Officer Jones removed Mr. Johnson from the patrol vehicle, handcuffed him, and notified him he was being placed under arrest for suspicion of driving under the influence. I then read Mr. Johnson his Miranda rights. Mr. Johnson was dropped off at the county jail without further incident."

As should be clear, the narrative is not the same thing as the transcript, but rather provides additional context and background that cannot be found from simply reading the transcript. First, since the narrative may be written in the first person perspective of the author and the author of the report 207 is known, it is clear that any references to "I" in the narrative refers to Officer John Smith. Second, a narrative will also include the identities of all persons involved in the incident. In this case, the narrative makes reference to the fact that Officer David Jones is also present at the incident. There is also a vehicle occupant, Robert Johnson, that is present and is described in the narrative. The narrative can thus be used to identify some or all of the speakers present during the incident. As will be explained in further detail below, the specific identifiers (e.g. names, etc.) of each person in the narrative can be correlated with the generic speaker identifier in the transcript that was described with respect to FIG. 1.

FIG. 3 is an example of the transcript as modified based on the narrative. The updated transcript 320 is the same as the transcript 120, with the exception that the generic speaker identifiers (e.g. Speaker 1, Speaker 2, etc.) have been replaced with specific identifiers (e.g. names) that have been extracted from the narrative. Although names are one type of specific identifier, it should be understood that other types of specific identifiers may also be extracted from the narrative. For example, the narrative may refer to officer badge numbers, or some other form of specific identifier.

There are several different ways that the specific identifier in the narrative can be correlated with the generic identifier in the transcript. One such mechanism is through the use of natural language processing. In segment 131 of the transcript, Speaker 1 is shown as asking if the person is OK or do they need an ambulance. Processing the narrative with natural language processing shows that the statement "Officer Jones asked the vehicle occupant if he was OK or needed medical assistance" is very similar to the transcribed segment. Natural language processing of the narrative can be used to determine that Officer Jones was the one who asked the question. As such, it can be determined that Officer Jones is speaker number 1. As shown in the transcript 320, the generic identifier "Speaker 1" in elements 331, 335, 337, 339, and 341 can be replaced with the specific identifier, "Officer David Jones."

Similarly, the sentence in the narrative that says, "I asked Mr. Johnson if he had consumed any alcoholic beverages" can be analyzed using natural language processing to determine that a question regarding use of alcoholic beverages was asked. In the transcript, transcribed speech 133 could be correlated with a question related to use of alcohol. As explained above, because it is known who wrote the report (e.g. Officer John Smith), any reference to "I" would indicate that it was Officer Smith that was speaking. Thus, all references to "Speaker 3" in the transcript could be converted to Officer John Smith. As shown in transcript 320, transcript items 333, 336, 338, and 340 could be converted to Officer John Smith.

Yet another way generic identifiers in the transcript can be correlated with the specific identifiers in the narrative is through the process of elimination. As shown in FIG. 1, there are a total of 3 Speakers. In the narrative shown in FIG. 2, three specific people are identified. From the previous description, it was determined that Speaker 1 is Officer Jones, while Speaker 3 is Officer Smith. Thus, the only person specifically identified in the narrative that has not yet been associated with a speaker in the transcript is the vehicle occupant, Robert Johnson. By process of elimination, Speaker 2 must be Robert Johnson, and transcript elements 332 and 334 may be updated to reflect that Speaker 2 can be identified by the specific identifier Robert Johnson.

In the example above, the text of the narrative and the transcript were processed using natural language processing to detect similarities between the two such that the specific identifiers in the narrative could be correlated with the generic identifiers in the transcript. However, matching of specific words is not necessarily required. Instead, topics that are being discussed in both the narrative and the transcript are represented by an embedding vector. The machine learning model used to generate the embedding vector may be trained on in-domain text. For example, in a public safety environment, the model may be a custom model trained on public safety data which has learned public safety phrases and their inherent meanings.

For example, the narrative 215 reads, "I then read Mr. Johnson his Miranda rights." The portion regarding reading of Miranda rights may be fed into the pre-trained model to generate a first embedding vector. Each segment in the transcript may also be fed into the same pre-trained model, resulting in an embedding vector for each segment. The transcript element 140 is a reading of Miranda rights. Because the model is pre-trained with public safety phrases, the embedding vector (e.g. second embedding vector) for statement 140 is likely to be sufficiently similar to the first embedding vector, meaning that the two statements likely relate to the same topic. Similarity comparisons may be simple, like cosine similarity with threshold values or more advanced, such as with a neural network. What should be understood is that similar topics with the transcript and narrative are identified.

Once similar topics have been identified, the specific identifiers present in the narrative can be correlated with the generic identifiers in the transcript. The generic identifiers in the transcript for each topic may then be replaced with the specific identifiers that correlate with similar topics in the narrative. What should be noted is that the model determines the embedding vector based on historical data, not on the actual words used in the narrative and or transcript. For example, the word "Miranda" does not appear anywhere in transcript 120, however the pre-trained model would have, based on historical data, determined that the words "You have the right to remain silent" are almost always associated with Miranda and as such both most likely relate to the topic of Miranda warnings.

Utilizing the techniques described above, the transcript may then be modified by replacing each of the generic identifiers (e.g. Speaker 1, Speaker 2, etc.) with the specific identifiers extracted from the narrative. For purposes of completeness, the updated transcript 320, with generic identifiers replaced with specific identifiers, is reproduced below.

Officer David Jones: "Sir, you appear to have been in a car accident. Are you OK or do you need an ambulance?" 331

Vehicle Occupant Robert Johnson: "No. I am fine, I don't need an ambulance." 332

Officer John Smith: "You seem to be having a little trouble standing up straight. Have you had anything alcoholic to drink tonight?" 333

Vehicle Occupant Robert Johnson: "No, I have not had anything to drink tonight." 334

Officer David Jones: "Why don't you have a seat in the back of the patrol car while we figure this out." 335

Officer John Smith: "Based on his eye movements, I think he is drunk." 336

Officer David Jones: "I agree. Plus, he has the smell of alcohol on his breath. We should arrest him on suspicion of driving under the influence." 337

Officer John Smith: "I agree." 338

Officer David Jones: "Please step out of the car and put your hands behind your back. You are being arrested on suspicion of driving under the influence." 339

Officer John Smith: "You have the right to remain silent. Anything you say can and will be used against you in a court of law. You have the right to an attorney. If you cannot afford an attorney, one will be appointed for you." 340

Officer David Jones: "Alright. Let's go drop this guy off at the jail." 341

FIG. 4 is an example of a high-level flow diagram 400 for associated narrative based transcription speaker identification according to the techniques described herein. In block 405, a narrative of an incident may be received at a computing device, the narrative describing an incident. As explained above, a public safety officer may write a narrative for each incident to which they respond. The narrative may describe, in human understandable terms, what occurred during the incident. The narrative is generally how an officer would verbally explain to another person what occurred during the response to the incident.

There are currently available techniques for automatic generation of narratives and the techniques described herein are compatible with any form of narrative whether created by a human or by a machine. In block 410, the narrative is a human generated description of the incident. However, the techniques described may be utilized regardless of how the narrative is created.

In block 415, an identification of at least one person involved in the incident may be extracted from the narrative, the identification including a specific identifier of the at least one person. As described above, the narrative should include a specific identifier of each person who was involved in the incident, including public safety officers, witnesses, suspects, etc. A well written narrative will include a specific identifier, such as a name, for each participant in the incident. In block 420, the specific identifier is a name of the at least one person. It should be understood that although a name is one example of a specific identifier, the techniques described herein are not so limited. Specific identifiers could include numeric identifiers (e.g. badge number, social security number, driver's license number, etc.).

In block 425, semantic information may be extracted from the narrative. Semantic information can include which persons were at the incident scene, what each of those persons said and/or did, the topics that were discussed by people at the incident scene, words used by people at the incident scene, the order of speaking of people at the incident scene could also be included, or any other information that may be useful in correlating specific identifiers in the narrative with generic identifiers in the transcript.

In block 430, a transcript of media capturing the incident may be received at the computing device. The transcript may include a generic identifier for at least one speaker whose speech was transcribed. As explained above, there are many known techniques used for transcription of audio as well as for diarization of such audio, which could also be included in the transcript. The diarization techniques typically produce a generic identifier (e.g. Speaker 1, etc.) because the techniques do not necessarily have access to the semantic and contextual information needed to associate each segment of the transcript with a more specific identifier. As shown in block 435, the media that is transcribed is video captured by a camera, the video including audio. For example, the video could be a police officer's body worn camera footage. However, it should be understood that any audio source, including audio sources not associated with video (e.g. phone calls, etc.) that is capable of being transcribed may be utilized by the techniques described herein.

In block 440, the generic identifier for the at least one speaker whose speech was transcribed may be correlated with the identification based on the semantic information. For example, natural language processing or word matching could be used to associate the semantic information extracted from the narrative (e.g. what a specifically identified person said and/or did) with a segment of text in the transcript. The semantic information could also include the topics mentioned in the narrative correlating to a sufficiently similar topic in the transcript.

In block 445, the generic identifier for the at least one speaker in the transcript may be replaced with the specific identifier included in the identification. In other words, the semantic information is extracted from the narrative to determine what a specific person in the narrative was doing and/or saying. This sematic information is then used to identify the generic speaker in the transcript that is doing and/or saying the same or sufficiently similar things in the transcript. The generic identifier in the transcript can then be replaced by the specific identifier extracted from the narrative.

FIG. 5 is an example of a high-level flow diagram 500 for using embedding vectors to correlate topics in the narrative and transcript according to the techniques described herein. In block 505, a machine learning model that has been trained using public safety specific phrases to generate the embedding vector is used to extract topics. The machine learning model is pre-trained to recognize public safety domain specific terminology to better understand the semantics of a narrative and transcripts.

In block 510, a topic may be extracted from the narrative. The topic may be associated with at least one person. In other words, the narrative is analyzed and a topic associated with at least one person mentioned in the narrative is identified. That at least one person is also associated with a specific identifier, as explained above. In block 515, the topic may be represented in the narrative as a first embedding vector. The pre-trained machine learning model may be given as an input the narrative. The model may then output embedding vectors representing each topic mentioned in the narrative. Each embedding vector may thus be associated with a specific person, the specific person having a specific identifier.

In block 520, the topic may be identified in the transcript. The topic may be associated with at least one speaker whose speech was transcribed. For example, in block 525, text associated with associated with the at least one speaker may be represented as a second embedding vector. In other words, the topic associated with eh first embedding vector may be located within the transcript by identifying a second embedding vector.

In block 530, it may be determined if the first embedding vector is sufficiently similar to the second embedding vector. If so, that means the portion of the narrative that generated the first embedding vector (and is associated with a specific identifier) is close enough to the portion of the transcript associated the second embedding vector (and associated with a generic identifier). This means that the two portions are close enough that the generic identifier of the transcript can be replaced with the specific identifier of the narrative. It should be noted that sufficiently similar may be set by the implementation. For example, a threshold value may be used and if a similarity metric exceeds the threshold value, the two embedding vectors may be declared to be equivalent.

FIG. 6 is an example of a high-level flow diagram 600 for identifying all speakers in a transcript according to the techniques described herein. Effectively, FIG. 6 describes repeating the flow described in FIG. 4 for all identified persons in the narrative. In block 610, an identification of all persons involved in an incident is extracted from the narrative. The identification includes specific identifiers of each person. The transcript includes generic identifiers for all speakers whose speech was transcribed.

In block 620, the generic identifiers for all the speakers whose speech was transcribed may be correlated with the identifications based on the semantic information. In other words, the portions of the narrative that correlate to portions of the transcript are identified. In block 630 the generic identifiers in the transcript may be replaced with the specific identifiers associated with the identifications based on the correlations.

FIG. 7 is an example of a device 700 that may implement the associated narrative based transcription speaker identification according to the techniques described herein. It should be understood that FIG. 7 represents one example implementation of a computing device that utilizes the techniques described herein. Although only a single processor is shown, it would be readily understood that a person of skill in the art would recognize that distributed implementations are also possible. For example, the various pieces of functionality described above (e.g. narrative processing, transcript processing, correlation, etc.) could be implemented on multiple devices that are communicatively coupled. FIG. 7 is not intended to imply that all the functionality described above must be implemented on a single device.

Device 700 may include processor 710, memory 720, non-transitory processor readable medium 730, transcript receiving interface 740, narrative receiving interface 750, and display 760.

Processor 710 may be coupled to memory 720. Memory 720 may store a set of instructions that when executed by processor 710 cause processor 710 to implement the techniques described herein. Processor 710 may cause memory 720 to load a set of processor executable instructions from non-transitory processor readable medium 730. Non-transitory processor readable medium 730 may contain a set of instructions thereon that when executed by processor 710 cause the processor to implement the various techniques described herein.

For example, medium 730 may include narrative processing instructions 731. The narrative processing instructions 731 may cause the processor to receive a narrative from a public safety officer via narrative receiving interface 750. For example, the narrative may be entered using a report writing system (not shown) and the resulting narrative sent to device 700. The narrative processing instructions 731 may cause the processor to identify specific identifiers of all persons mentioned in the narrative and identify, via natural language processing or machine learning techniques, words and topics used in the narrative. The narrative processing instructions 731 are described throughout this description generally, including places such as the description of blocks 405-425, 505-515, and 610.

The medium 730 may include transcript processing instructions 732. The transcript processing instructions 732 may cause the processor to receive a transcript of an audio stream from a recording made by a public safety officer via transcript receiving interface 740. For example, the transcript may be created using a transcription and diarization system (not shown) and the resulting transcript sent to device 700. The transcript processing instructions 732 may cause the processor to identify generic identifiers of all persons mentioned in the narrative and identify, via natural language processing or machine learning techniques, words and topics used in the transcript. The narrative processing instructions 731 are described throughout this description generally, including places such as the description of blocks 430, 435, 520, 525, and 610.

The medium 730 may include correlation processing instructions 733. The correlation processing instructions 733 may cause the processor to correlate the words and topics identified by the narrative processing instructions 731 and the transcript processing instructions 732 to determine which specific identifiers from the narrative should be associated with which generic identifier from the transcript. The correlation processing instructions 733 are described throughout this description generally, including places such as the description of blocks 440, 530, and 620.

The medium 730 may include transcript update instructions 734. The transcription update instructions 734 may cause the processor to update the received transcript by replacing the generic identifiers in the transcript with the associated specific identifiers that were identified using the correlation instructions 733. The transcription update instructions 734 are described throughout this description generally, including places such as the description of blocks

440 and 630. The transcription update instructions 734 may further cause the processor to output the updated transcription to a user via a display 760 (e.g. computer monitor, smartphone screen, etc.).

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot automatically correlate portions of a narrative with portions of a transcript using natural language processing and machine learning pre-trained models at the scale needed for a viable implementation, among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for associated narrative based transcription speaker identification comprising:

receiving, at a computing device, a narrative of an incident, the narrative describing an incident, wherein the narrative is a human generated description of the incident, wherein the narrative is a summary of what occurred during the incident, wherein the narrative is created following the incident;

extracting, from the narrative, an identification of at least one person involved in the incident, the identification including a specific identifier of the at least one person, wherein the specific identifier is a name of the at least one person;

extracting, from the narrative, semantic information;

receiving, at the computing device, a transcript of media capturing the incident, the transcript including a generic identifier for at least one speaker whose speech was transcribed, wherein the identity of the at least one speaker is not known;

correlating the generic identifier for the at least one speaker whose speech was transcribed with the identification based on the semantic information; and replacing, in the transcript, the generic identifier for the at least one speaker with the specific identifier included in the identification.

2. The method of claim 1 wherein the correlation further comprises:

extracting, from the narrative, a topic in the narrative, the topic associated with the at least one person; and identifying, in the transcript, the topic, the topic associated with the at least one speaker whose speech was transcribed.

3. The method of claim 2 identifying the topic and correlation further comprises:

representing the topic in the narrative as a first embedding vector;

representing, in the transcript, text associated with the at least one speaker as a second embedding vector; and determining if the first embedding vector is sufficiently similar to the second embedding vector.

4. The method of claim 3 wherein representing the topic as a feature vector further comprises:

using a machine learning model that has been trained using public safety specific phrases to generate the embedding vector.

5. The method of claim 1 wherein the media that is transcribed is video captured by a camera, the video including audio.

6. The method of claim 1 further comprising:

extracting, from the narrative, an identification of all persons involved in the incident, the identification including specific identifiers of each person, wherein the transcript includes generic identifiers for all speakers whose speech was transcribed;

correlating the generic identifiers for all the speakers whose speech was transcribed with the identifications based on the semantic information; and replacing, in the transcript, the generic identifiers with the specific identifiers associated with the identifications based on the correlation.

7. A system for associated narrative based transcription speaker identification comprising:

a processor; and a memory coupled to the processor, the memory containing a set of instructions thereon that when executed by the processor cause the processor to:

receive a narrative of an incident, the narrative describing an incident, wherein the narrative is a human generated description of the incident, wherein the narrative is a summary of what occurred during the incident, wherein the narrative is created following the incident;

extract, from the narrative, an identification of at least one person involved in the incident, the identification including a specific identifier of the at least one person, wherein the specific identifier is a name of the at least one person;

extract, from the narrative, semantic information;

receive a transcript of media capturing the incident, the transcript including a generic identifier for at least one speaker whose speech was transcribed, wherein the identity of the at least one speaker is not known;

correlate the generic identifier for the at least one speaker whose speech was transcribed with the identification based on the semantic information; and replace, in the transcript, the generic identifier for the at least one speaker with the specific identifier included in the identification.

8. The system of claim 7 wherein the correlation instructions further comprise instructions to:

extract, from the narrative, a topic in the narrative, the topic associated with the at least one person; and identify, in the transcript, the topic, the topic associated with the at least one speaker whose speech was transcribed.

9. The system of claim 8 wherein the identifying the topic and correlation instructions further comprise instructions to:

represent the topic in the narrative as a first embedding vector;

represent, in the transcript, text associated with the at least one speaker as a second embedding vector; and determine if the first embedding vector is sufficiently similar to the second embedding vector.

10. The system of claim 9 wherein representing the topic as a feature vector instructions further comprise instructions to:

use a machine learning model that has been trained using public safety specific phrases to generate the embedding vector.

11. The system of claim 7 wherein the media that is transcribed is video captured by a camera, the video including audio.

12. The system of claim 7 further comprising instructions to:

extract, from the narrative, an identification of all persons involved in the incident, the identification including specific identifiers of each person, wherein the transcript includes generic identifiers for all speakers whose speech was transcribed;

correlate the generic identifiers for all the speakers whose speech was transcribed with the identifications based on the semantic information; and replace, in the transcript, the generic identifiers with the specific identifiers associated with the identifications based on the correlation.

13. A non-transitory processor readable medium containing a set of instructions thereon that when executed by a processor cause the processor to:

18 receive a narrative of an incident, the narrative describing an incident, wherein the narrative is a human generated description of the incident, wherein the narrative is a summary of what occurred during the incident, wherein the narrative is created following the incident;

extract, from the narrative, an identification of at least one person involved in the incident, the identification including a specific identifier of the at least one person, wherein the specific identifier is a name of the at least one person;

extract, from the narrative, semantic information;

receive a transcript of media capturing the incident, the transcript including a generic identifier for at least one speaker whose speech was transcribed, wherein the identity of the at least one speaker is not known;

correlate the generic identifier for the at least one speaker whose speech was transcribed with the identification based on the semantic information; and replace, in the transcript, the generic identifier for the at least one speaker with the specific identifier included in the identification.

14. The medium of claim 13 wherein the correlation instructions further comprise instructions to:

extract, from the narrative, a topic in the narrative, the topic associated with the at least one person; and identify, in the transcript, the topic, the topic associated with the at least one speaker whose speech was transcribed.

15. The medium of claim 14 wherein the identifying the topic and correlation instructions further comprise instructions to:

represent the topic in the narrative as a first embedding vector;

represent, in the transcript, text associated with the at least one speaker as a second embedding vector; and determine if the first embedding vector is sufficiently similar to the second embedding vector.

16. The medium of claim 15 wherein representing the topic as a feature vector instructions further comprise instructions to:

use a machine learning model that has been trained using public safety specific phrases to generate the embedding vector.

17. The medium of claim 13 wherein the media that is transcribed is video captured by a camera, the video including audio.

18. The medium of claim 13 further comprising instructions to:

extract, from the narrative, an identification of all persons involved in the incident, the identification including specific identifiers of each person, wherein the transcript includes generic identifiers for all speakers whose speech was transcribed;

correlate the generic identifiers for all the speakers whose speech was transcribed with the identifications based on the semantic information; and replace, in the transcript, the generic identifiers with the specific identifiers associated with the identifications based on the correlation.

* * * * *